United States Patent
Carlson et al.

(10) Patent No.: US 7,266,394 B2
(45) Date of Patent: Sep. 4, 2007

(54) FULL SCREEN DISPLAY OF KEY ENTRIES

(75) Inventors: Michael Pierre Carlson, Austin, TX (US); Linda Arnold Lisle, Cedar Park, TX (US); Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 10/960,589

(22) Filed: Oct. 7, 2004

(65) Prior Publication Data

US 2006/0079292 A1 Apr. 13, 2006

(51) Int. Cl.
*H04B 1/00* (2006.01)
*H04M 1/00* (2006.01)

(52) U.S. Cl. .............. 455/566; 455/575.1; 455/550.1

(58) Field of Classification Search .......... 455/566, 455/575.1, 66.1, 556.2, 550.1, 556.1; 379/433.04, 379/88.11; 345/660, 471, 472, 472.1
See application file for complete search history.

(56) References Cited

U.S. PATENT DOCUMENTS

| | | | |
|---|---|---|---|
| 4,520,399 A * | 5/1985 | Iida | 358/451 |
| 5,715,311 A | 2/1998 | Sudo et al. | 379/428 |
| 5,771,469 A | 6/1998 | Toba | 455/566 |
| 6,073,036 A | 6/2000 | Heikkinen et al. | 455/575 |
| 6,233,467 B1 | 5/2001 | Rydbeck | 455/566 |
| 7,072,461 B2 * | 7/2006 | Padawer et al. | 379/355.09 |
| 2003/0153371 A1 * | 8/2003 | Choi | 455/575 |
| 2003/0200012 A1 | 10/2003 | Odinak et al. | 701/1 |
| 2005/0159189 A1 * | 7/2005 | Iyer | 455/566 |
| 2006/0050090 A1 * | 3/2006 | Ahmed et al. | 345/660 |
| 2006/0128438 A1 * | 6/2006 | Balle et al. | 455/566 |

OTHER PUBLICATIONS

U.S. Appl. No. 10/388,952, Rojas et al., Method, System, and Computer Program Product for Providing Visual Assistance in Display of Information on a Display Device, Mar. 13, 2003.

* cited by examiner

*Primary Examiner*—Sonny Trinh
(74) *Attorney, Agent, or Firm*—Duke W. Yee; Justin M. Dillon; Theodore D. Fay, III

(57) ABSTRACT

A method, apparatus, and computer instructions for displaying keystrokes on a display screen in the mobile communications device. In response to detecting a user input selecting a character on a keypad, the character is displayed on the display screen using a full screen display of the character. The full screen display is adjusted to the selected size after a selected period of time.

20 Claims, 3 Drawing Sheets

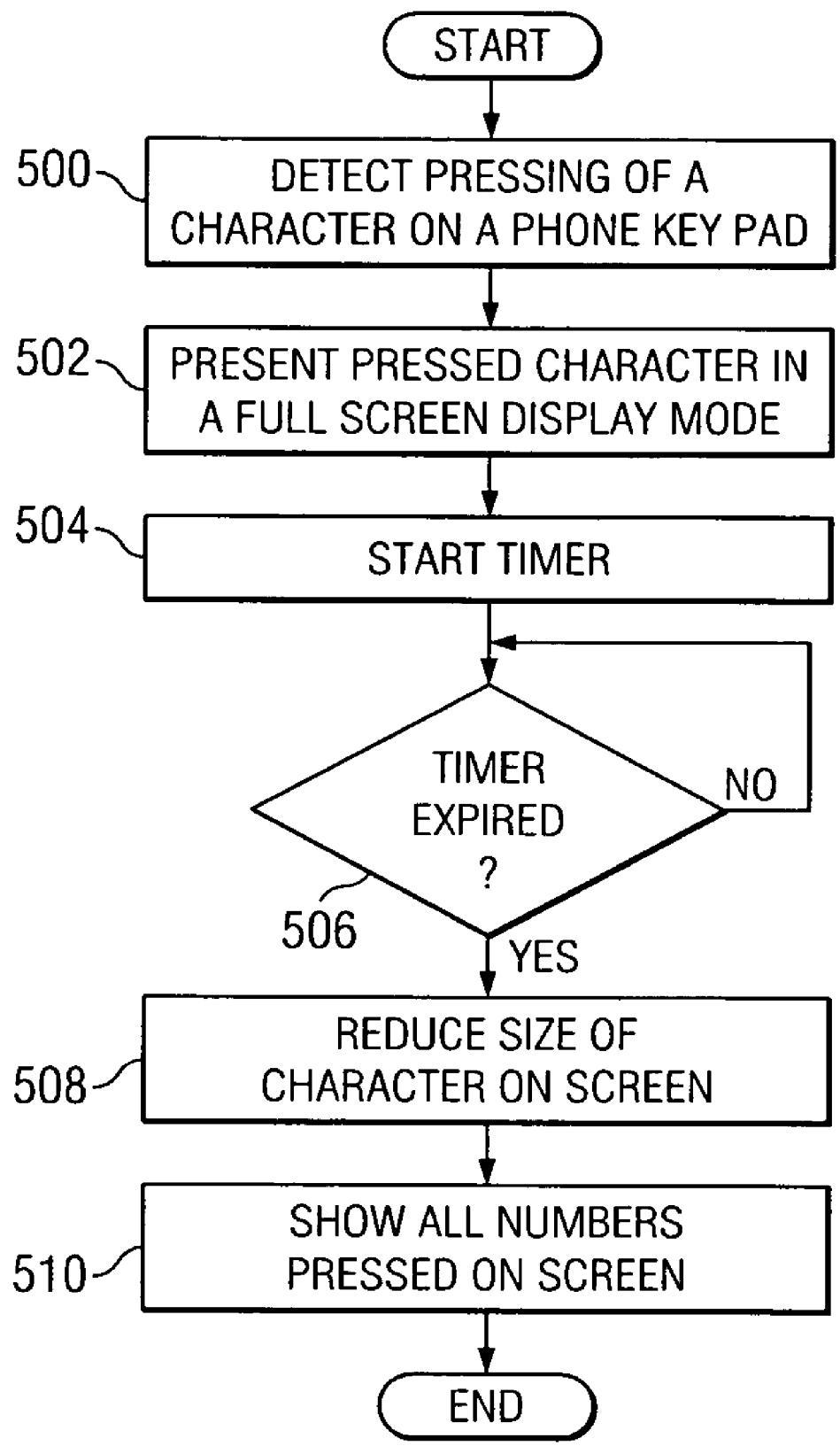

FULL SCREEN DISPLAY OF KEY ENTRIES

BACKGROUND OF THE INVENTION

1. Technical Field

The present invention relates generally to an improved data processing system and in particular to a method and apparatus for processing data. Still more particularly, the present invention relates to a method, apparatus, and computer instructions for displaying user input of key entries.

2. Description of Related Art

Mobile phone systems use various transmission protocols, such as a global system for mobile communications (GSM) and code-division multiple access (CDMA). Mobile phones have proven to be a very beneficial tool for people to exchange information when they are away from the home or office. Millions of people use mobile phones for talking to others. In addition, these mobile phones also are able to exchange data, such as e-mail messages and text messages. A user of a mobile phone may send or receive e-mail in a fashion similar to that of a computer. The e-mail message may be displayed on a screen to the user and the user also may respond to the e-mail message. Additionally, a user also may store contact information, make task or to do lists, track appointments, and set reminders using a mobile phone. Further, users also may obtain information, such as news, entertainment, and stock quotes from the Internet through mobile phones. Mobile phones often also include simple games and may integrate other devices, such as personal digital assistant or a MP3 player. Additionally, many mobile phones also incorporate global positioning (GPS) receivers. As can be seen, with all of these features and functions, mobile phones are a widely used device.

With all of these functions, mobile phones are becoming smaller and smaller. Additionally, the displays also become smaller such that a character rendered on a mobile phone display is small and often difficult to read. This difficulty is especially a problem for people with poor vision or people who are performing other activities, such as driving. In some cases, a user may adjust the font size such that each number entered is displayed in a different font size. Increasing the font size, however, reduces the amount of information that may be displayed on the mobile phone. Therefore, increasing the font size has a limited use. Therefore, it would be advantageous to have an improved method, apparatus, and computer instructions for displaying characters on a display.

SUMMARY OF THE INVENTION

The present invention provides a method, apparatus, and computer instructions for displaying keystrokes on a display screen in the mobile communications device. In response to detecting a user input selecting a character on a keypad, the character is displayed on the display screen using a full screen display of the character. The full screen display is adjusted to the selected size after a selected period of time.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart of a process for displaying key entries in accordance with a preferred embodiment of the present invention.

DETAILED DESCRIPTION OF THE PREFERRED EMBODIMENT

Figure 1:
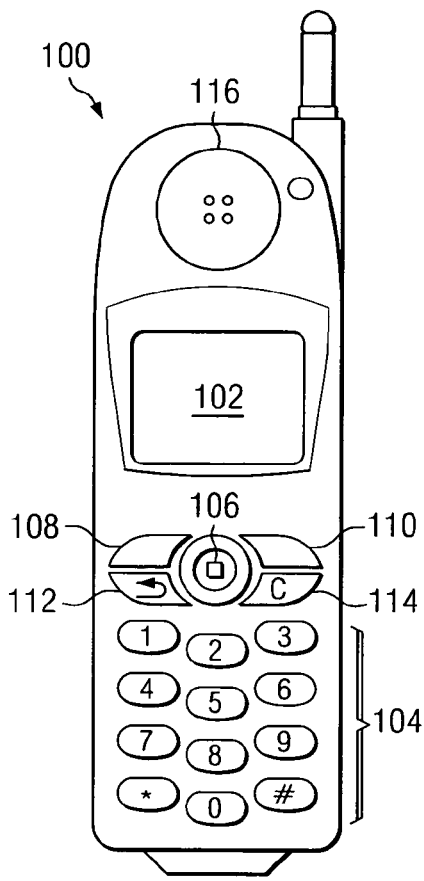
FIG. 1 is a mobile telephone in which the present invention may be implemented.

With reference now to the figures and in particular with reference to FIG. 1, a mobile telephone is depicted in which the present invention may be implemented. Mobile phone 100 includes screen 102, which is capable of displaying pictures and text. Additionally, mobile phone 100 also includes numeric keypad 104, joystick 106, and buttons 108, 110, 112, and 114 placed around the joystick 106. These buttons are used to initiate various functions in mobile phone 100. These functions include, for example, activating a menu, displaying a calendar, or initiating a call. Mobile phone 100 also includes a camera phone 116, which may be used to take pictures or videos depending on the implementation.

Figure 2:
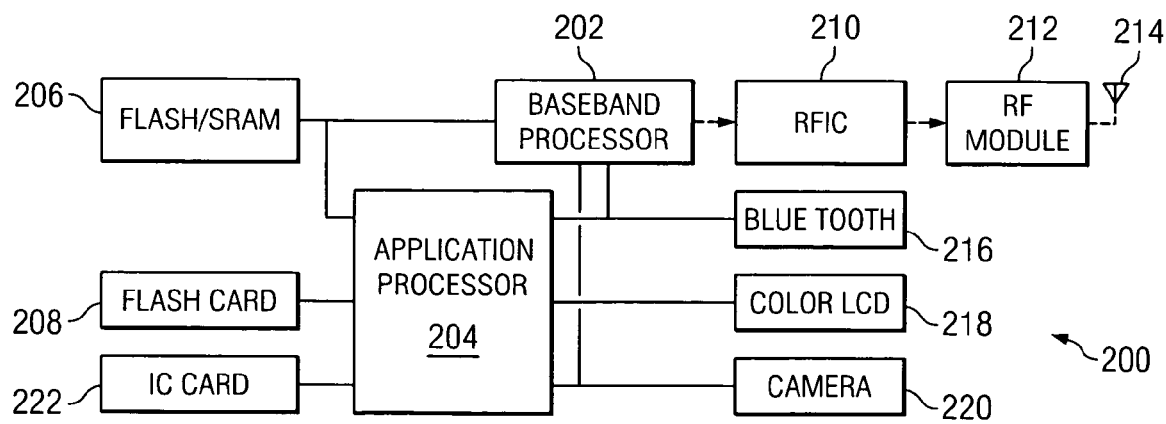
FIG. 2 is a block diagram of a camera phone in accordance with a preferred embodiment of the present invention.

Turning next to FIG. 2, a block diagram of a camera phone is depicted in accordance with the preferred embodiment of the present invention. Camera phone 200 includes baseband processor 202, application processor 204, flash/static random access memory (SRAM) 206, flash card 208, radio frequency integrated circuit (RFIC) 210, radio frequency (RF) module 212, antenna 214, Blue Tooth unit 216, color liquid crystal display (LDC) 218, camera 220, and IC card 222.

Baseband processor 202 provides for receiver and transmitter operations and is also referred to as a transceiver. In particular, baseband processor 202 handles all of the audio, signal, and data processing needed to receive and send data using RF transmissions or Blue Tooth transmissions. Application processor 204 provides the processing power for other functions within camera phone 200. For example, calculators, calendars, alarms, camera functions, and directories are provided through application processor 204. Flash/SRAM 206 is a storage device in which various instructions for providing the functions within camera phone 200 are located and provide upgrades. Flash card 208 is a storage device in which user data and applications may be stored. An example of flash card 208 is a secure digital card.

A pathway for the transmission of voice and other types of data is through RFIC 210. Additionally, short range transmissions may be sent or received through Blue Tooth unit 216. Blue Tooth unit 216 conforms to Blue Tooth wireless specification, which defines the link layer and application layer for product developers. Both of these transmissions are made through antenna 214 in this illustrative example.

Color LCD 218 provides a display for pictures and other data for camera phone 200. Camera 220, in this example, is a complementary metal oxide semiconductor (CMOS) camera which may be built into camera phone 200 or connected to camera phone 200 as a module, such as IC card 222. IC card 222 also may contain other application specific functions, such as a global positioning system (GPS) or other functions, such as a modem or additional memory.

Camera 220 forms the camera module of camera phone 200, while the other components form the digital phone module of camera phone 200 in these illustrative examples. Instructions or circuits are added to camera phone 200 to provide a display of key entries that are easily readable by user. The present invention provides a method, apparatus, and computer instructions for a full screen display of key entries made by user to a device, such as camera phone 200.

The present invention displays keystrokes on a display screen within a mobile device, such as camera phone 200 in FIG. 2, in which the keystrokes are normally displayed using a selected size for the fonts. When a user inputs selects or presses a character on a keypad, the character is displayed on the screen using a full screen display mode to display the character. A full screen display of a character occurs such that only the number is seen on the screen. Other numbers that may have been previously pressed are not displayed at this time. After some period of time, the full screen display adjusts to the selected size normally used to display numbers on the mobile device. This occurs after some selected period of time, such as five seconds. At that time, the other numbers that have been previously selected are displayed along with the number that was displayed in a full screen display.

Figure 3:
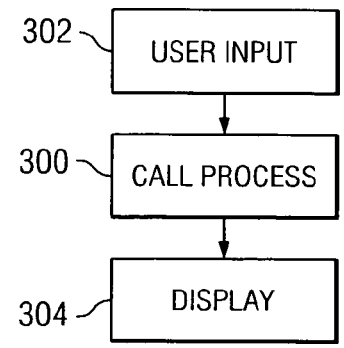
FIG. 3 is a diagram illustrating components used in displaying key entries in accordance with a preferred embodiment of the present invention.

Turning next to FIG. 3, a diagram illustrating components used in displaying key entries is depicted in accordance with the preferred embodiment of the present invention.

A character may be an alpha character or a numeric character in these examples. In this example, call process 300 is an example of a process that may be implemented, such as in application processor 204, in FIG. 2 to send and receive calls. User input 302 is received by call process 300 in response to a user pressing a key on a mobile device. In response, the user input is displayed on display 304. Display 304 may be implemented using a monitor, such as color LCD 218 in FIG. 2. In these illustrative examples, the character input by the user for user input 302 is displayed on display 304 using a full screen display. A full screen display results only in the character from user input 302 being displayed on the screen. In any other characters previously displayed on display 304 is no longer seen in this example. After some period of time, the full screen display of the character is adjusted back to the normal size. At that time, the character input by the user may be seen along with any other characters previously inputted by the user. When the user has completed inputting characters, such as numbers for a phone number, the user may initiate a call-to-call process 300. This mechanism uses a variable font such that the font size may take advantage of the available screen space. In these examples, the full screen display uses 100% of the available space to display a character entered by a user.

Figure 4A:
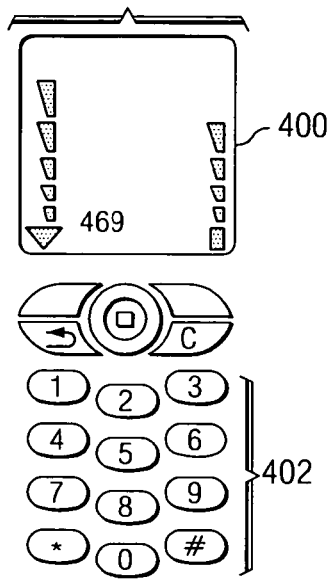
FIGS. 4A-4E are examples of displays for displaying characters entered by a user in accordance with a preferred embodiment of the present invention.

Turning next to FIGS. 4A-4E, examples of displays for displaying characters entered by user is depicted in accordance with the preferred embodiment of the present invention. The screens illustrated in these figures are examples of screen displays, such as those from mobile phone in FIG. 1. In FIG. 4A, display 400 is shown in which the numbers 4, 6, and 9 have been previously entered by a user through keypad 402.

Figure 4B:
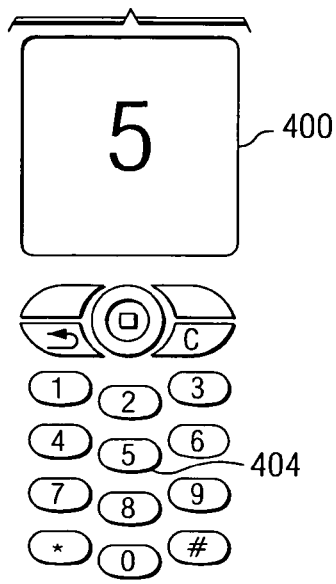
Figure 4C:
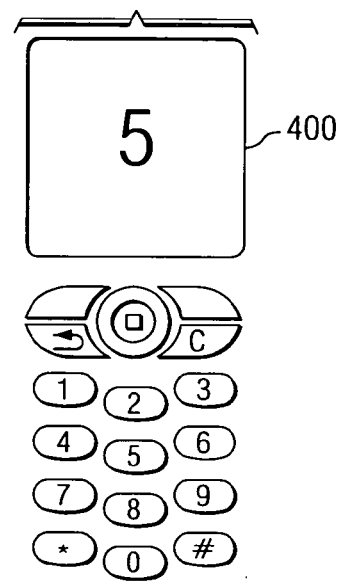
Figure 4D:
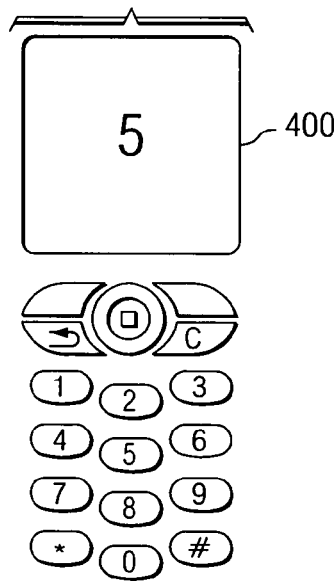
Figure 4E:
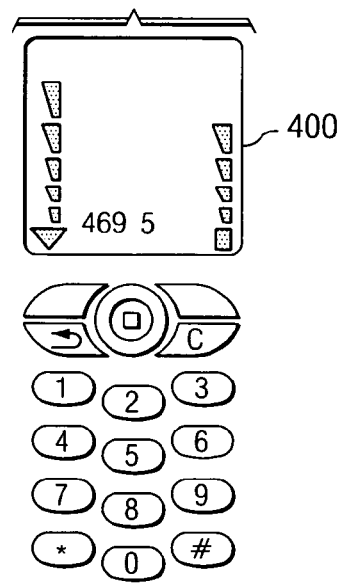

In FIG. 4B, the user has pressed key 404 in keypad 402. As a result, display 400 now shows a full screen display of the number 5 in response to pressing key 404. In FIG. 4C, display 400 adjusts the full screen display making the number into a smaller size with the smaller size being shown in display 400 in FIG. 4D. In this example, both of these screens are in full screen mode in which no other characters are shown. Finally, in FIG. 4E, display 400 shows the number 5 along with the other numbers previously entered by the user. At this time, the display of the characters is in the selected or normal size.

Turning next to FIG. 5, a flowchart of a process for displaying key entries is depicted in accordance with the preferred embodiment of the present invention. The process illustrated in FIG. 5 may be implemented in a call process, such as call process 300 in FIG. 3.

The process begins by the depressing of a character on a phone keypad (step 500). Thereafter, the pressed character is presented in a full screen mode on the display (step 502). A timer is started (step 504). Thereafter, a determination is made as to whether the timer has expired (step 506). If the timer has not expired, the process returns to step 506.

Upon the timer expiring, the size of the character displayed on the screen is reduced (step 508). After the size of the character has been reduced to the normal or selected size, all of the characters that have been previously entered are now displayed on the screen in their normal or selected fonts (step 510) with the process terminating thereafter. This process is repeated each time a user enters a character.

Thus, the present invention provides an improved method, apparatus, and computer instructions for displaying key entries on a display. This mechanism is especially useful for devices with limited screen sizes, such as mobile phones or PDAs. The mechanism of the present invention displays a character in a full screen display in response to a character being entered by a user's input. The character then reduces the size to a smaller size and takes its position with any other characters previously entered. At that time, the character is in a normal or selected font size typically used to display characters on the screen of the device.

By using a variable font size, the font size may take advantage of the available screen space rather than using a fixed font size. In this manner, the mechanism of the present invention provides an improved safety feature for users in the event that the user is performing another activity while trying to enter characters. Further, the mechanism of the present invention is useful to users who are visually impaired.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a mobile communications device for displaying keystrokes on a display screen in the mobile communications device, wherein keystrokes are normally displayed using a selected size, the method comprising:
   responsive to detecting a user input selecting a character on a keypad, displaying the character on the display screen using a full screen display of the character; and
   adjusting the full screen display to the selected size after a selected period of time.

2. The method of claim 1 further comprising:
   displaying all characters input into the mobile communications device after the full screen display of the character has been adjusted to the selected size.

3. The method of claim 1, wherein the adjusting step includes
   reducing the size of the character to the selected size from the full screen display in a series of steps.

4. The method of claim 1, wherein the selected period of time is five seconds.

5. The method of claim 1, wherein the mobile communications device is a mobile phone.

6. The method of claim 1, wherein the mobile communications device is a personal digital assistant.

7. The method of claim 1, wherein the character is one of an alphabetical character or a numeric character.

8. A data processing system in a mobile communications device for displaying keystrokes on a display screen in the mobile communications device, wherein keystrokes are normally displayed using a selected size, the data processing system comprising:
   displaying means, responsive to detecting a user input selecting a character on a keypad, for displaying the character on the display screen using a full screen display of the character; and
   adjusting means for adjusting the full screen display to the selected size after a selected period of time.

9. The data processing system of claim 8 further comprising:
   displaying all characters input into the mobile communications device after the full screen display of the character has been adjusted to the selected size.

10. The data processing system of claim 8, wherein the adjusting means includes
    reducing means for reducing the size of the character to the selected size from the full screen display in a series of steps.

11. The data processing system of claim 8, wherein the selected period of time is five seconds.

12. The data processing system of claim 8, wherein the mobile communications device is a mobile phone.

13. The data processing system of claim 8, wherein the mobile communications device is a personal digital assistant.

14. The data processing system of claim 8, wherein the character is one of an alphabetical character or a numeric character.

15. A computer program product in a computer readable medium in a mobile communications device for displaying keystrokes on a display screen in the mobile communications device, wherein keystrokes are normally displayed using a selected size, the computer program product comprising:
    first instructions, responsive to detecting a user input selecting a character on a keypad, for displaying the character on the display screen using a full screen display of the character; and
    second instructions for adjusting the full screen display to the selected size after a selected period of time.

16. The computer program product of claim 15 further comprising:
    third instructions for displaying all characters input into the mobile communications device after the full screen display of the character has been adjusted to the selected size.

17. The computer program product of claim 15, wherein the second instructions includes
    sub-instructions for reducing the size of the character to the selected size from the full screen display in a series of steps.

18. The computer program product of claim 15, wherein the selected period of time is five seconds.

19. The computer program product of claim 15, wherein the mobile communications device is a mobile phone.

20. The computer program product of claim 15, wherein the mobile communications device is a personal digital assistant.

* * * * *